(12) United States Patent
Suzuki

(10) Patent No.: US 8,094,822 B2
(45) Date of Patent: Jan. 10, 2012

(54) BROADCAST ENCRYPTION KEY DISTRIBUTION SYSTEM

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 1005 days.

(21) Appl. No.: 10/509,872

(22) PCT Filed: Feb. 3, 2004

(86) PCT No.: PCT/JP2004/001076
§ 371 (c)(1),
(2), (4) Date: Feb. 3, 2005

(87) PCT Pub. No.: WO2004/071006
PCT Pub. Date: Aug. 19, 2004

(65) Prior Publication Data
US 2005/0123141 A1  Jun. 9, 2005

(30) Foreign Application Priority Data
Feb. 3, 2003  (JP) .................... 2003-026543

(51) Int. Cl.
*H04L 9/00* (2006.01)
(52) U.S. Cl. .................. 380/277; 713/171
(58) Field of Classification Search .......... 380/259–266, 380/277; 713/171, 163
See application file for complete search history.

(56) References Cited

U.S. PATENT DOCUMENTS

| | | | |
|---|---|---|---|
| 6,185,680 B1 * | 2/2001 | Shimbo et al. | 713/160 |
| 6,229,806 B1 * | 5/2001 | Lockhart et al. | 370/389 |
| 6,295,361 B1 * | 9/2001 | Kadansky et al. | 380/278 |
| 6,496,928 B1 * | 12/2002 | Deo et al. | 713/153 |
| 6,912,657 B2 * | 6/2005 | Gehrmann | 713/171 |
| 7,231,664 B2 * | 6/2007 | Markham et al. | 726/15 |
| 7,336,790 B1 * | 2/2008 | Caronni et al. | 380/277 |
| 7,386,726 B2 * | 6/2008 | Gehrmann et al. | 713/175 |
| 2002/0098830 A1 * | 7/2002 | Lauper et al. | 455/411 |
| 2002/0132584 A1 * | 9/2002 | Izumi | 455/41 |

(Continued)

FOREIGN PATENT DOCUMENTS

JP  10-107832  4/1998

(Continued)

OTHER PUBLICATIONS

Stallings, "Cryptography and Network Security: Principles and Practice", 3rd edition, Pearson Education, pp. 388-389.*

(Continued)

*Primary Examiner* — Benjamin Lanier
*Assistant Examiner* — Hadi Armouche
(74) *Attorney, Agent, or Firm* — Oblon, Spivak, McClelland, Maier & Neustadt, L.L.P.

(57) ABSTRACT

Each terminal in a wireless ad-hoc communication system includes an encryption-key management list table 660. The encryption-key management list table 660 stores, in association with a terminal identifier 661 such as a MAC address, a unicast encryption key 662 for use in unicast communication with a terminal identified by the terminal identifier 661, and a broadcast encryption key 663 used when the terminal identified by the terminal identifier 661 performs broadcast communication. Therefore, a broadcast encryption key is provided for each terminal that performs broadcast communication, and the broadcast encryption keys are managed by the individual terminals in an independent and distributed manner. This allows independent and distributed management of broadcast encryption keys in a wireless ad-hoc communication system.

5 Claims, 17 Drawing Sheets

U.S. PATENT DOCUMENTS

| | | |
|---|---|---|
| 2002/0143855 A1* | 10/2002 | Traversat et al. ............. 709/202 |
| 2002/0196764 A1* | 12/2002 | Shimizu ........................ 370/338 |
| 2003/0217289 A1* | 11/2003 | Ammon et al. ............... 713/201 |
| 2004/0015689 A1* | 1/2004 | Billhartz ....................... 713/156 |

FOREIGN PATENT DOCUMENTS

| | | |
|---|---|---|
| JP | 2001-136159 | 5/2001 |
| JP | 2002-111679 | 4/2002 |

OTHER PUBLICATIONS

U.S. Appl. No. 11/567,067, filed Dec. 5, 2006, Suzuki.
U.S. Appl. No. 11/742,989, filed May 1, 2007, Suzuki, et al.
U.S. Appl. No. 10/508,137, filed Sep. 17, 2004, Suzuki.
U.S. Appl. No. 10/784,271, filed Feb. 24, 2004, Suzuki, et al.

* cited by examiner

| TERMINAL IDENTIFIER 611 | PUBLIC KEY CERTIFICATE 612 |
|---|---|
| TERMINAL X | PUBLIC KEY CERTIFICATE X |
| TERMINAL Y | PUBLIC KEY CERTIFICATE Y |
| ⋮ | ⋮ |

BROADCAST KEY

680

| END-TERMINAL IDENTIFIER ~681 | FORWARDING-TERMINAL IDENTIFIER ~682 | EXPIRATION TIME ~683 |
|---|---|---|
| TERMINAL B | TERMINAL B | 1 : 30 |
| TERMINAL C | TERMINAL C | 0 : 50 |
| TERMINAL D | TERMINAL D | 0 : 30 |
| | | |

FIG. 7

BROADCAST ENCRYPTION KEY DISTRIBUTION SYSTEM

TECHNICAL FIELD

The present invention relates to a wireless ad-hoc communication system. More particularly, the present invention relates to a wireless ad-hoc communication system in which a broadcast frame is encrypted using a broadcast encryption key unique to each terminal to maintain confidentiality, a terminal in this system, a processing method in them, and a program that causes a computer (or a terminal) to execute this method.

BACKGROUND ART

With the compactness, high performance, and portability of electronic devices, there have been demanded environments where terminals are connected to a network at any location, if necessary, to perform communication. A network that is temporarily established, if necessary, called wireless ad-hoc network technology, has been being developed. In a wireless ad-hoc network, no particular access point is provided, and terminals (e.g., computers, personal digital assistances (PDAs), portable phones, etc.) that are independently decentralized are connected with one another. In such a wireless ad-hoc communication system, there also has been demanded confidentiality using encryption, etc., to perform transmission and reception of important information or private communication safely without interception of any third party.

Generally, two encryption methods are employed for encrypting communication content, i.e., a common key encryption method in which the same common key is used by the encrypting and decoding parties, and a public key encryption method in which encryption is performed using a public key and decoding is performed using a secret key. The common key encryption method enables encryption and decoding at high speed; however, the communication parties must share a common key beforehand using a certain method. On the other hand, although the processing is slower than the common key encryption method, the public key encryption method has an advantage in that the communication parties need not share a key. Therefore, a hybrid encryption method combining the high-speed performance of the common key encryption method and the usability of the public key encryption method is widely used. More specifically, a common key is encrypted using the public key encryption method and is then transmitted, and the common key that is shared between the communication parties is used to encrypt actual communication data.

The common key used for encrypting communication data is classified into a unicast encryption key and a broadcast encryption key depending upon the use. The unicast encryption key is a common key for use in unicast communication between two terminals, which is not known by terminals other than those two terminals. The broadcast encryption key is a common key used when each terminal decodes broadcast communication from a terminal, which is shared by all terminals involved with the broadcast communication. Therefore, the broadcast encryption key is generally more difficult to provide confidentiality than with unicast encryption key.

In a traditional communication system, broadcast encryption keys are managed solely by a specific device on a network in order to ensure the confidentiality of the broadcast encryption keys in a broadcast group. For example, a technique for encrypting a broadcast message using a broadcast encryption key that is configured in advance by a wireless carrier, which is a network owner of mobile devices, has been proposed (see, for example, PCT Japanese Patent Publication No. 2002-501334 (FIG. 1)).

Although broadcast encryption keys are managed at one location in a traditional communication system, terminals are always moving in a wireless ad-hoc communication system. The terminals frequently participate in or are disconnected from a network, and therefore, terminals constituting a broadcast group cannot be fixed. Due to the nature of wireless media, a communication path to such a sole management device is not always maintained. Therefore, the wireless ad-hoc communication system is not suitable for sole management.

Accordingly, it is an object of the present invention to provide independent and distributed management of broadcast encryption keys in a wireless ad-hoc communication system. The present invention is particularly useful in a wireless network in which all wireless terminals setting up the network transmit management information (such as a beacon).

DISCLOSURE OF INVENTION

In order to overcome the above-described object, a wireless ad-hoc communication system according to claim 1 of the present invention is a wireless ad-hoc communication system constituted by a plurality of terminals, including a first terminal that encrypts a payload of a broadcast frame and that transmits the broadcast frame, and a second terminal that receives the broadcast frame and that decodes the payload of the broadcast frame, wherein the first terminal encrypts the payload of the broadcast frame using a broadcast encryption key of the first terminal, and the second terminal decodes the payload of the broadcast frame using the broadcast encryption key of the first terminal. Thus, an advantage that a broadcast encryption key can be configured for each terminal in an independent and distributed manner is achieved.

The wireless ad-hoc communication system according to claim 2 of the present invention is such that in the wireless ad-hoc communication system according to claim 1, the second terminal includes an encryption-key management list table having at least an encryption-key management list including a set of a terminal identifier of the first terminal and a broadcast encryption key of the first terminal, means for searching the encryption-key management list table based on the terminal identifier of the first terminal included in a start-terminal identifier of the received broadcast frame to extract the corresponding broadcast encryption key of the first terminal, and means for decoding the payload of the broadcast frame using the extracted broadcast encryption key of the first terminal. Thus, an advantage that a broadcast encryption key is selectable depending upon the start-terminal identifier of a broadcast frame is achieved.

The wireless ad-hoc communication system according to claim 3 of the present invention is such that in the wireless ad-hoc communication system according to claim 8, the first terminal includes a generated-key table that stores the broadcast encryption key of the first terminal, means for encrypting the payload of the broadcast frame using the broadcast encryption key of the first terminal stored in the generated-key table, and means for transmitting the encrypted broadcast frame. Thus, an advantage that a broadcast frame can be encrypted using a broadcast encryption key unique to each terminal in broadcast communication is achieved.

A terminal according to claim 4 of the present invention includes an encryption-key management list table having at least one encryption-key management list including a set of a terminal identifier of a different terminal and a broadcast encryption key of the different terminal, means for searching the encryption-key management list table for the encryption-key management list including a start-terminal identifier of a received broadcast frame to extract the corresponding broadcast encryption key, and means for decoding a payload of the broadcast frame using the extracted broadcast encryption key. Thus, advantages that a broadcast encryption key is configured for each terminal in an independent and distributed manner and a broadcast encryption key is selectable depending upon the start-terminal identifier of a broadcast frame are achieved.

A terminal according to claim 5 of the present invention includes an encryption-key management list table having at least one encryption-key management list that stores a unicast encryption key between this terminal and a different terminal and a broadcast encryption key of the different terminal in association with a terminal identifier of the different terminal, means for, when an end-terminal identifier of a received frame is a broadcast address, searching the encryption-key management list table for the encryption-key management list including a start-terminal identifier of the frame to extract the corresponding broadcast encryption key as an encryption key, and when the end-terminal identifier of the received frame is other than a broadcast address, searching the encryption-key management list table for the encryption-key management list including a start-terminal identifier of the frame to extract the corresponding unicast encryption key as the encryption key, and means for decoding a payload of the frame using the extracted encryption key. Thus, an advantage that a broadcast encryption key and a unicast encryption key can be separately used depending upon the end-terminal identifier of a received frame is achieved.

A terminal according to claim 6 of the present invention includes a generated-key table that stores a broadcast encryption key of this terminal, means for encrypting a payload of a broadcast frame using the broadcast encryption key, and means for transmitting the encrypted broadcast frame. Thus, an advantage that a broadcast frame can be encrypted using a broadcast encryption key unique to each terminal in broadcast communication is achieved.

A terminal according to claim 7 of the present invention includes a generated-key table that stores a broadcast encryption key of this terminal, an encryption-key management list table having at least one encryption-key management list that stores a unicast encryption key between this terminal and a different terminal in association with a terminal identifier of the different terminal, means for, when a frame to be transmitted is a broadcast frame, encrypting a payload of the broadcast frame using the broadcast encryption key of the generated-key table, and when the frame to be transmitted is a unicast frame, searching the encryption-key management list table for the encryption-key management list including an end-terminal identifier of the unicast frame to encrypt a payload of the unicast frame using the corresponding unicast encryption key, and means for transmitting the encrypted frame. Thus, an advantage that a broadcast encryption key and a unicast encryption key can be separately used depending upon the end-terminal identifier of a frame to be transmitted is achieved.

A terminal according to claim 8 of the present invention includes means for encrypting a terminal identifier and a broadcast encryption key of this terminal using a unicast encryption key of a transmission-destination terminal, and means for transmitting the encrypted terminal identifier and broadcast encryption key of this terminal to the transmission-destination terminal. Thus, an advantage that a broadcast encryption key of a given terminal is distributed under management of the given terminal is achieved.

A terminal according to claim 9 of the present invention includes an encryption-key management list table having at least one encryption-key management list that stores a broadcast encryption key of a different terminal in association with a terminal identifier of the different terminal, means for encrypting the encryption-key management list using a unicast encryption key of a transmission-destination terminal, and means for transmitting the encrypted encryption-key management list to the transmission-destination terminal. Thus, an advantage that a broadcast encryption key group (encryption-key management list) that is managed by a given terminal is independently distributed is achieved.

A terminal according to claim 10 of the present invention includes means for receiving a terminal identifier and a broadcast encryption key of a different terminal from the different terminal, means for encrypting the terminal identifier and broadcast encryption key of the different terminal using a broadcast encryption key of the above-described terminal, and means for broadcasting the encrypted terminal identifier and broadcast encryption key of the different terminal. Thus, an advantage that a broadcast encryption key of another terminal is independently distributed is achieved.

A method for decoding a broadcast frame according to claim 11 of the present invention is a method for decoding a broadcast frame in a terminal that includes an encryption-key management list table having at least one encryption-key management list including a set of a terminal identifier of a different terminal and a broadcast encryption key of the different terminal, including the steps of searching the encryption-key management list table for the encryption-key management list including a start-terminal identifier of a received broadcast frame to extract the corresponding broadcast encryption key, and decoding a payload of the broadcast frame using the extracted broadcast encryption key. Thus, an advantage that a broadcast encryption key for use in decoding is selectable depending upon the start-terminal identifier of a broadcast frame is achieved.

A method for encrypting a broadcast frame according to claim 12 of the present invention is a method for encrypting a broadcast frame in a terminal that includes a generated-key table storing a broadcast encryption key of this terminal, including the steps of encrypting a payload of the broadcast frame using the broadcast encryption key stored in the generated-key table, and transmitting the encrypted broadcast frame. Thus, an advantage that a broadcast frame can be encrypted using a broadcast encryption key unique to each terminal in broadcast communication is achieved.

A method for distributing a broadcast encryption key according to claim 13 of the present invention includes the steps of receiving a terminal identifier and a broadcast encryption key of a first terminal that are encrypted using a unicast encryption key between the first terminal and a second terminal, decoding the encrypted terminal identifier and broadcast encryption key of the first terminal using the unicast encryption key, encrypting a terminal identifier and a broadcast encryption key of the second terminal using the unicast encryption key, and transmitting the encrypted terminal identifier and broadcast encryption key of the second terminal to the first terminal. Thus, an advantage that the first terminal and the second terminal can deliver their broadcast encryption keys to each other is achieved.

A method for distributing a broadcast encryption key according to claim 14 of the present invention includes the steps of receiving a terminal identifier and a broadcast encryption key of a first terminal that are encrypted using a unicast encryption key between the first terminal and a second terminal, decoding the encrypted terminal identifier and broadcast encryption key of the first terminal using the unicast encryption key, encrypting a terminal identifier and a broadcast encryption key of the first terminal using a broadcast encryption key of the second terminal, and transmitting the encrypted terminal identifier and broadcast encryption key of the first terminal to a third terminal. Thus, an advantage that a broadcast encryption key of a first terminal is broadcasted to a third terminal is achieved.

A program according to claim 15 of the present invention causes a terminal that includes an encryption-key management list table having at least one encryption-key management list including a set of a terminal identifier of a different terminal and a broadcast encryption key of the different terminal to execute the steps of searching the encryption-key management list table for the encryption-key management list including a start-terminal identifier of a received broadcast frame to extract the corresponding broadcast encryption key, and decoding a payload of the broadcast frame using the extracted broadcast encryption key. Thus, an advantage that a broadcast encryption key for use in decoding is selectable depending upon the start-terminal identifier of the broadcast frame is achieved.

A program according to claim 16 of the present invention executes a terminal that includes a generated-key table storing a broadcast encryption key of this terminal to execute the steps of encrypting a payload of a broadcast frame using the broadcast encryption key stored in the generated-key table, and transmitting the encrypted broadcast frame. Thus, an advantage that a broadcast frame can be encrypted using a broadcast encryption key unique to each terminal in broadcast communication is achieved.

A program according to claim 17 of the present invention causes a second terminal to execute the steps of receiving a terminal identifier and a broadcast encryption key of a first terminal that are encrypted using a unicast encryption key between the first terminal and the second terminal, decoding the encrypted terminal identifier and broadcast encryption key of the first terminal using the unicast encryption key, encrypting a terminal identifier and a broadcast encryption key of the second terminal using the unicast encryption key, and transmitting the encrypted terminal identifier and broadcast encryption key of the second terminal to the first terminal. Thus, an advantage that the first terminal and the second terminal deliver their broadcast encryption keys to each other is achieved.

A program according to claim 18 of the present invention causes a second terminal to execute the steps of receiving a terminal identifier and a broadcast encryption key of a first terminal that are encrypted using a unicast encryption key between the first terminal and the second terminal, decoding the encrypted terminal identifier and broadcast encryption key of the first terminal using the unicast encryption key, encrypting the terminal identifier and the broadcast encryption key of the first terminal using a broadcast encryption key of the second terminal, and transmitting the encrypted terminal identifier and broadcast encryption key of the first terminal to a third terminal. Thus, an advantage that a broadcast encryption key of a first terminal is broadcasted to a third terminal is achieved.

BRIEF DESCRIPTION OF THE DRAWINGS

FIG. 2 is an illustration showing an example structure of an attribute-certificate-issuing-terminal list table 610 according to the embodiment of the present invention.

FIG. 7 is an illustration showing an example structure of a routing table 680 according to the embodiment of the present invention.

BEST MODE FOR CARRYING OUT THE INVENTION

An embodiment of the present invention will now be described in detail with reference to the drawings.

Figure 1:
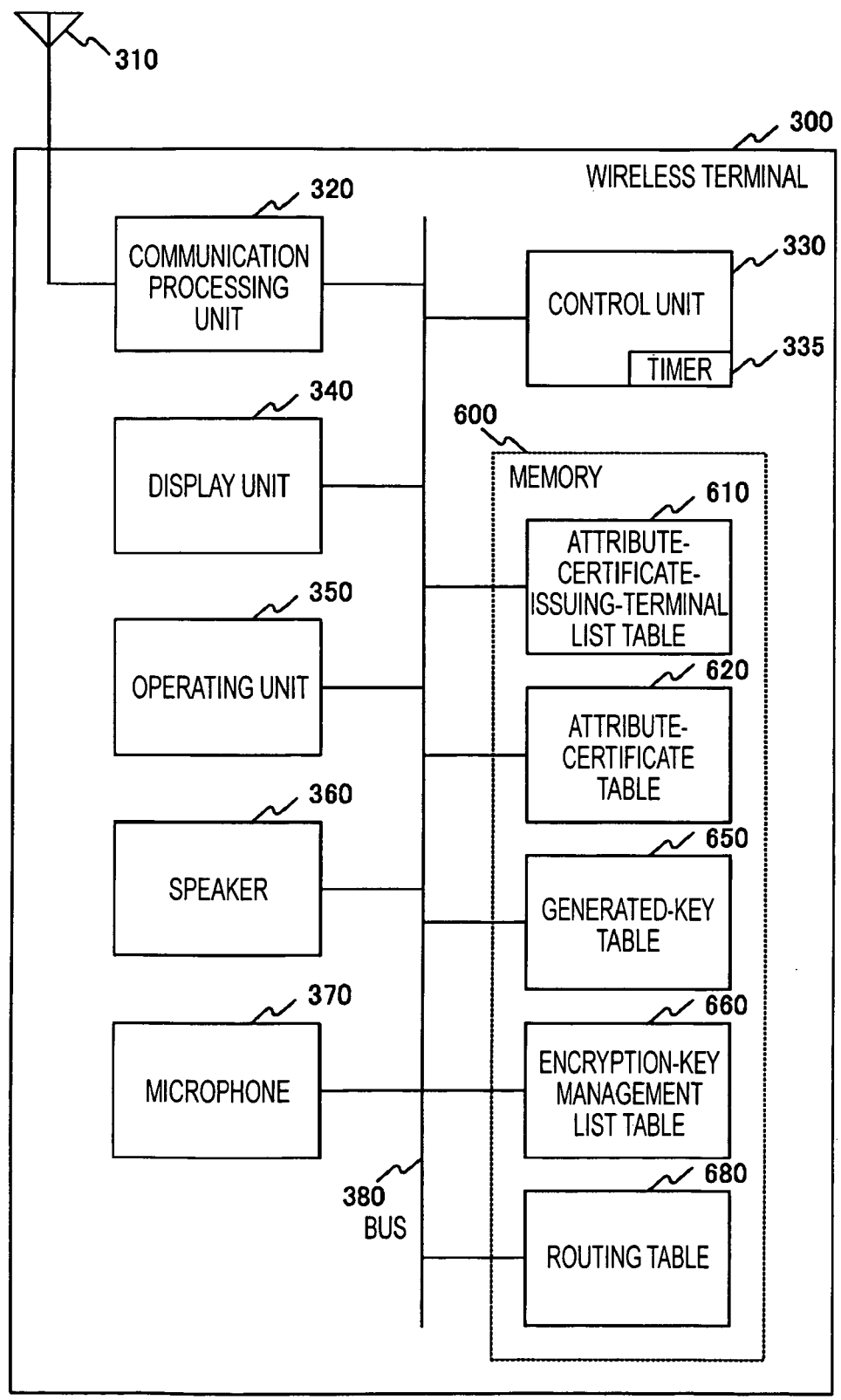
FIG. 1 is a block diagram of a wireless terminal 300 used in a wireless ad-hoc communication system according to an embodiment of the present invention.

FIG. 1 is a block diagram of a wireless terminal 300 used in a wireless ad-hoc communication system according to an embodiment of the present invention. The wireless terminal 300 includes a communication processing unit 320, a control unit 330, a display unit 340, an operating unit 350, a speaker 360, a microphone 370, and a memory 600, and these components are connected via a bus 380. The communication processing unit 320 is connected with an antenna 310. The communication processing unit 320 configures a network interface layer (data link layer) frame from a signal received via the antenna 310. The communication processing unit 320 transmits the network interface layer frame via the antenna 310.

The control unit 330 controls the overall wireless terminal 300. For example, the control unit 330 refers to the frame configured by the communication processing unit 320 to perform predetermined processing. The control unit 330 includes a timer 335 for counting the time elapsed from a predetermined event. The display unit 340 displays predetermined information, and may be implemented by, for example, a liquid crystal display or the like. The operating unit 350 is operated to enter instructions to the wireless terminal 300 from outside, and may be implemented by, for example, a keyboard, a button switch, or the like. The speaker 360 is used for audio output, and is used to alert the user of the wireless terminal 300 or to exchange audio information with other terminals. The microphone 370 is used for audio input to the wireless terminal 300 from outside, and is used to exchange audio information with other terminals or to instruct operations.

The memory 600 stores an attribute-certificate-issuing-terminal list table 610 including information about attribute certificate issuing terminals, an attribute-certificate table 620 including attribute certificates indicating access rights of the wireless terminal 300, a generated-key table 650 including information about generated keys of the wireless terminal 300, that is, a public key, a secret key, a public key certificate, and a broadcast encryption key of the wireless terminal 300, and an encryption-key management list table 660 including a unicast encryption key shared with other terminals and broadcast encryption keys of other terminals.

FIG. 2 shows an example structure of the attribute-certificate-issuing-terminal list table 610 according to the embodiment of the present invention. The attribute-certificate-issuing-terminal list table 610 stores information about terminals that have issued an attribute certificate, and includes a public key certificate 612 in association with a terminal identifier 611 of each attribute-certificate issuing terminal. The terminal identifier 611 may be an identifier that uniquely identifies a terminal in a network, and may be represented by, for example, a MAC (Media Access Control) address in the Ethernet®. The public key certificate 612 is a public key certificate of a terminal identified by the corresponding terminal identifier 611. The public key certificate verifies the identity of the certificate owner (subject), and includes a public key of the certificate owner. The public key certificate is signed by a certificate authority (CA) serving as a certificate issuer.

Figure 3:
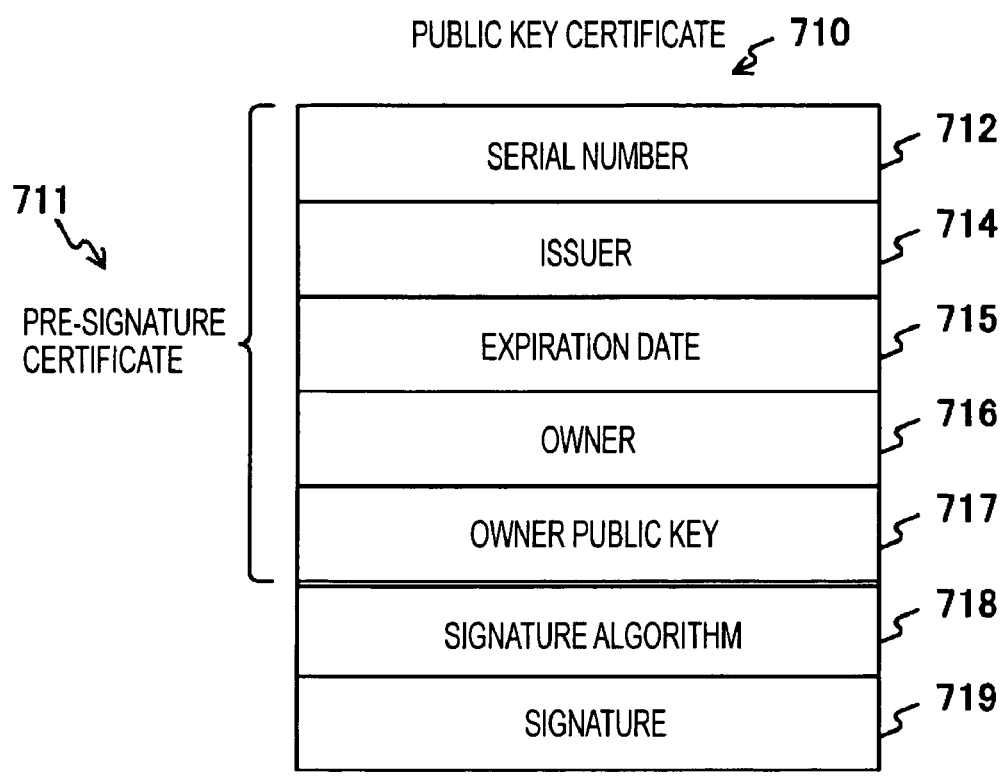
FIG. 3 is a diagram showing a format 710 of a public key certificate 612 stored in the attribute-certificate-issuing-terminal list table 610 according to the embodiment of the present invention.

FIG. 3 is a diagram showing a format 710 of the public key certificate 612 stored in the attribute-certificate-issuing-terminal list table 610. The public key certificate format 710 is generally constituted by a pre-signature certificate 711, a signature algorithm 718, and a signature 719. The pre-signature certificate 711 includes a serial number 712, an issuer 714, an expiration date 715, an owner 716, an owner 716, and an owner public key 717.

The serial number 712 represents a serial number of the public key certificate, and is numbered by the certificate authority. The issuer 714 represents the name of the certificate authority serving as a public key certificate issuer. The public key certificate is uniquely identified by the issuer 714 and the serial number 712. The expiration date 715 represents an expiration date of the public key certificate. The owner 716 represents the name of the owner of the public key certificate. The owner public key 717 represents a public key of the owner 716.

The signature 719 represents a signature added to the public key certificate by the certificate authority, and the signature algorithm 718 represents a signature algorithm used for the signature 719. The signature algorithm is constituted by two algorithms, i.e., a message-digest algorithm and a public key encryption algorithm. The message-digest algorithm is one type of hash function (summary function), and is an algorithm by which a message digest of the pre-signature certificate 711 is generated. The message digest is obtained by compressing input data (the pre-signature certificate 711) into a fixed-length bit sequence, and is also referred to as thumbprint, fingerprint, or the like. Known message-digest algorithms include SHA-1 (Secure Hash Algorithm 1), MD2 (Message Digest #2), MD5 (Message Digest #5), and so forth. The public key encryption algorithm is an algorithm by which the message digest obtained by the message-digest algorithm is encrypted using a certificate-authority secret key. Known public key encryption algorithms include RSA based on the prime factorization problem, DSA based on the discrete logarithm problem, and so forth. The message digest of the pre-signature certificate 711 is encrypted using the certificate-authority secret key to produce the signature, 719.

The signature 719 of the public key certificate is decoded using a certificate-authority public key to obtain a message digest. The user of the public key certificate generates a message digest of the pre-signature certificate 711, and compares the generated message digest with the message digest decoded by the certificate-authority public key to verify that the content of the pre-signature certificate 711 is not tampered with.

Figure 4:
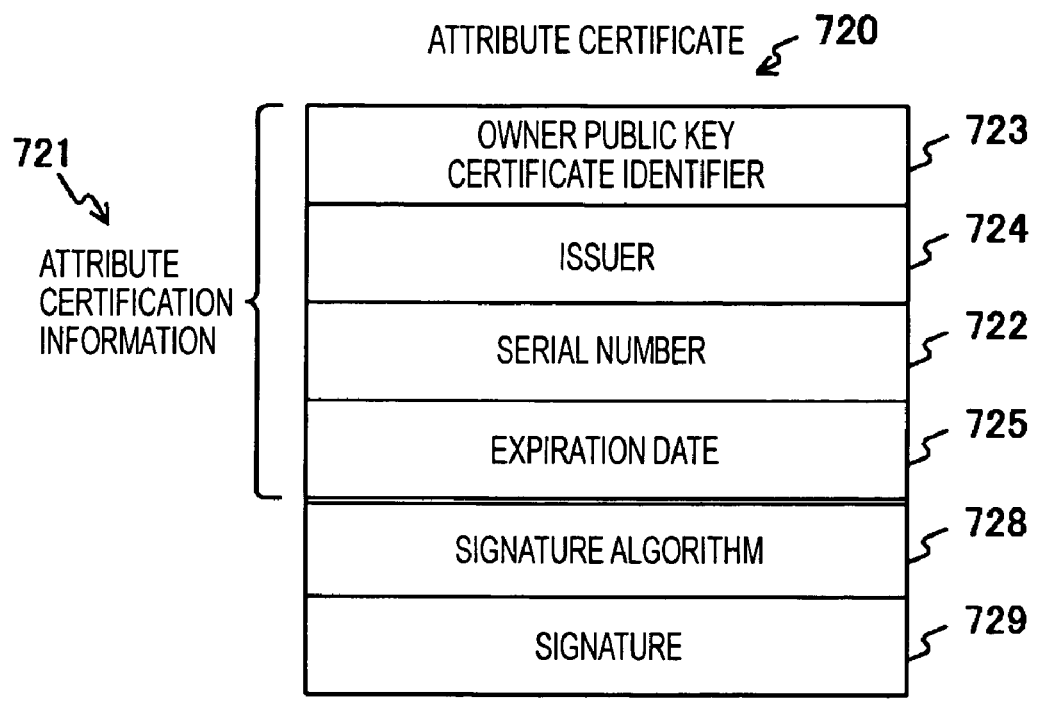
FIG. 4 is a diagram showing a format 720 of an attribute certificate stored in an attribute certificate table 620 according to the embodiment of the present invention.

FIG. 4 is a diagram showing a format 720 of the attribute certificate stored in the attribute-certificate table 620. The attribute certificate is generally constituted by attribute certification information 721, a signature algorithm 728, and a signature 729. The attribute certification information 721 includes an owner public key certificate identifier 723, an issuer 724, a serial number 722, and an expiration date 725.

The owner public key certificate identifier 723 identifies a public key certificate of the owner of the attribute certificate. More specifically, the public key certificate is identified using the issuer 714 and the serial number 712 of the public key certificate 710 (see FIG. 3). The issuer 724 represents the number of an attribute certificate authority (AA) serving as an attribute certificate issuer. The serial number 722 represents a serial number of the attribute certificate, and is numbered by the attribute certificate authority serving as an attribute certificate issuer. The attribute certificate is uniquely identified by the serial number 722 and the issuer 724. The expiration date 725 represents an expiration date of the attribute certificate.

The signature 729 represents a signature added to the attribute certificate by the attribute certificate authority, and the signature algorithm 728 represents a signature algorithm used for the signature 729. The details of the signature algorithm are similar to those of the signature algorithm 718 of the public key certificate described above, and the message digest of the attribute certification information 721 is encrypted using an attribute-certificate-authority secret key to produce the signature 729.

The signature 729 of the attribute certificate is decoded using an attribute-certificate-authority public key to obtain a message digest. The user of the attribute certificate generates a message digest of the attribute certification information 721, and compares the generated message digest with the message digest decoded by the attribute-certificate-authority public key to verify that the content of the attribute certification information 721 is not tampered with.

In this document, an attribute certificate is described as a privilege certificate that serves to authorize a terminal to access a network. However, for example, terminal rights described in an XML language or the like, which are signed by an authorized authority, may function as the privilege certificate according to the present invention.

Figure 5:
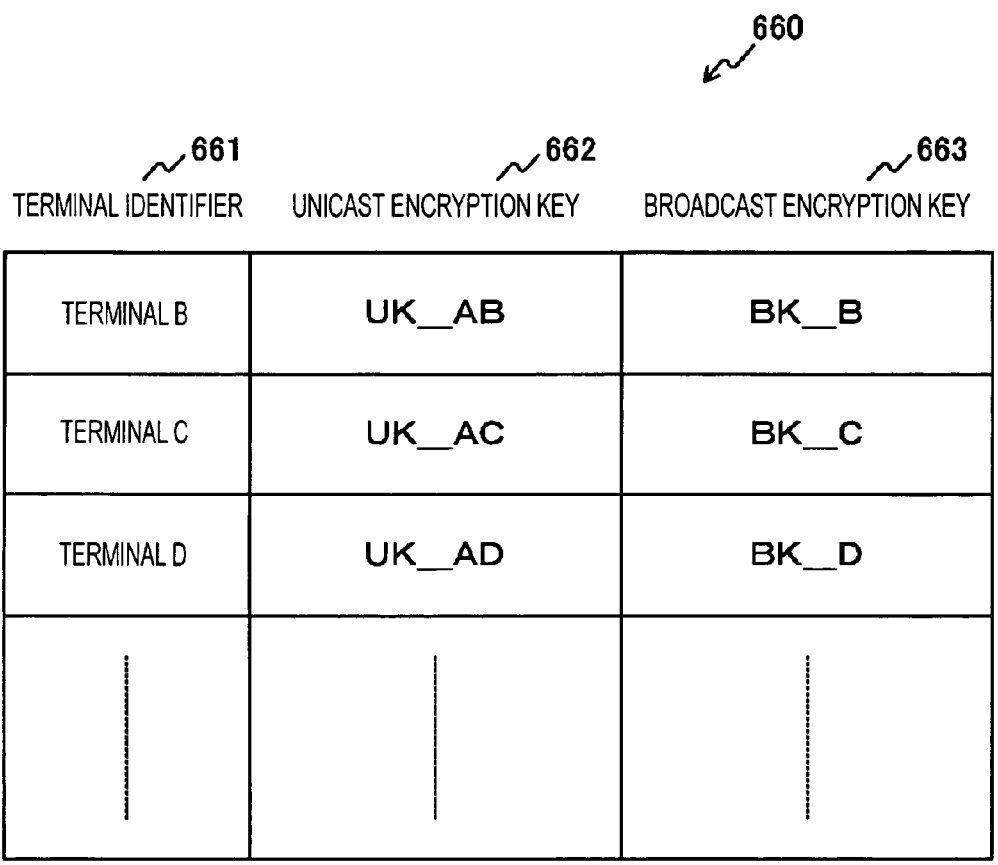
FIG. 5 is an illustration showing an example structure of an encryption-key management list table 660 according to the embodiment of the present invention.

FIG. 5 illustrates an example structure of the encryption-key management list table 660 according to the embodiment of the present invention. The encryption-key management list table 660 stores a broadcast key for use in decoding and a unicast key for use in encryption and decoding. The encryption-key management list table 660 includes at least one encryption-key management list that stores a unicast encryption key 662 shared with a different terminal and a broadcast encryption key 663 of the different terminal in association with a terminal identifier 661 of the different terminal.

As described above, the terminal identifier 661 uniquely identifies another terminal, and may be represented by, for example, a MAC address. The unicast encryption key 662 is a common key defined for unicast communication with a terminal having the corresponding terminal identifier 661. The unicast encryption key 662, e.g., a unicast encryption key used between a terminal A and a terminal B, is represented by "UK_AB." The broadcast encryption key 663 is a common key defined for a terminal having the corresponding terminal identifier 661 to perform broadcast communication. The broadcast encryption key 663, e.g., a broadcast encryption key for use in broadcast communication from a terminal B, is represented by "BK_B."

Known common key algorithms used for the unicast encryption key and the broadcast encryption key include DES (Data Encryption Standard) having a key length of 56 bits, AES (Advanced Encryption Standard) having three key lengths, i.e., 128 bits, 192 bits, and 256 bits, and so forth.

Figure 6A:
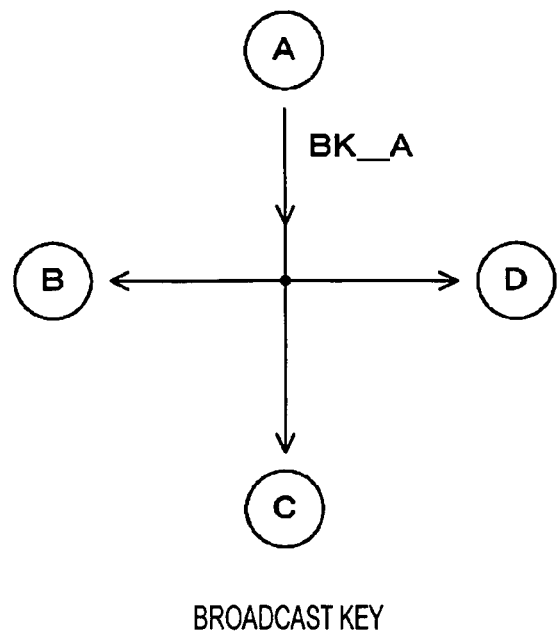
FIGS. 6A and 6B are diagrams showing a function of a broadcast encryption key and a unicast encryption key according to the embodiment of the present invention.
Figure 6B:
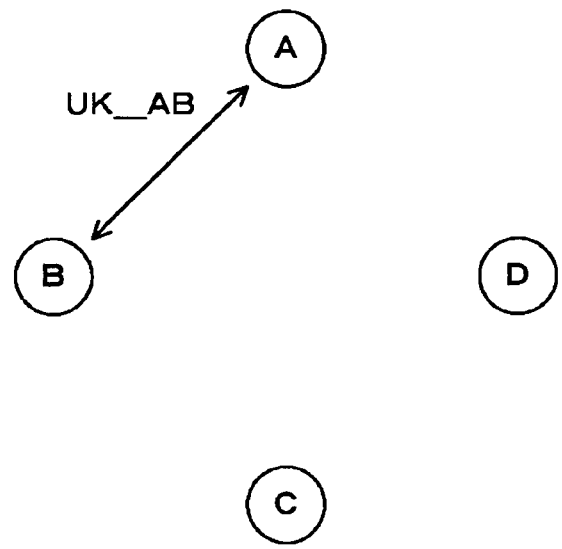

FIGS. 6A and 6B illustrate a function of a broadcast encryption key and a unicast encryption key according to the embodiment of the present invention. The broadcast encryption key is a common key defined for each terminal that performs broadcast communication, which is commonly used for encryption in a broadcast transmitting terminal and decoding in a broadcast receiving terminal. For example, a broadcast encryption key (BK_A) of a terminal A is used for encryption when the terminal A transmits broadcast communication, and is used for decoding when terminals other than the terminal A receive the broadcast communication from the terminal A.

The unicast encryption key is a common key defined for each terminal pair, which is commonly used for encrypting and decoding communication in the terminal pair. For example, a unicast encryption key (UK_AB) between a terminal A and a terminal B is used not only for encryption when the terminal A transmits unicast communication to the terminal B and for decoding when the terminal B receives the unicast communication from the terminal A, but is also used for encryption when the terminal B transmits unicast communication to the terminal A and for decoding when the terminal A receives the unicast communication from the terminal B.

FIG. 7 illustrates an example structure of a routing table 680 according to the embodiment of the present invention. The routing table 680 stores information about forwarding terminals through which a frame reaches an end terminal. The routing table 680 includes at least one route list that stores a terminal identifier 682 of a terminal to which the frame is forwarded and an expiration time 683 in association with a terminal identifier 681 of an end terminal.

The end-terminal identifier 681 and the forwarding-terminal identifier 682 uniquely identify other terminals, as described above, and indicate the next terminal to which the frame is to be forwarded in order to finally deliver the frame to a given terminal.

In a wireless ad-hoc communication system, the network configuration can change over time. The information stored in the routing table 680 can therefore be out of date. The expiration time 683 is used to manage the freshness of the corresponding information. For example, the time when the information was updated or the elapsed time from the time when the information was updated may be recorded in the expiration time 683, so that when the information has passed a predetermined time, it can be deleted or updated. The timer 335 of the control unit 330 is used to count the time.

Figure 8:
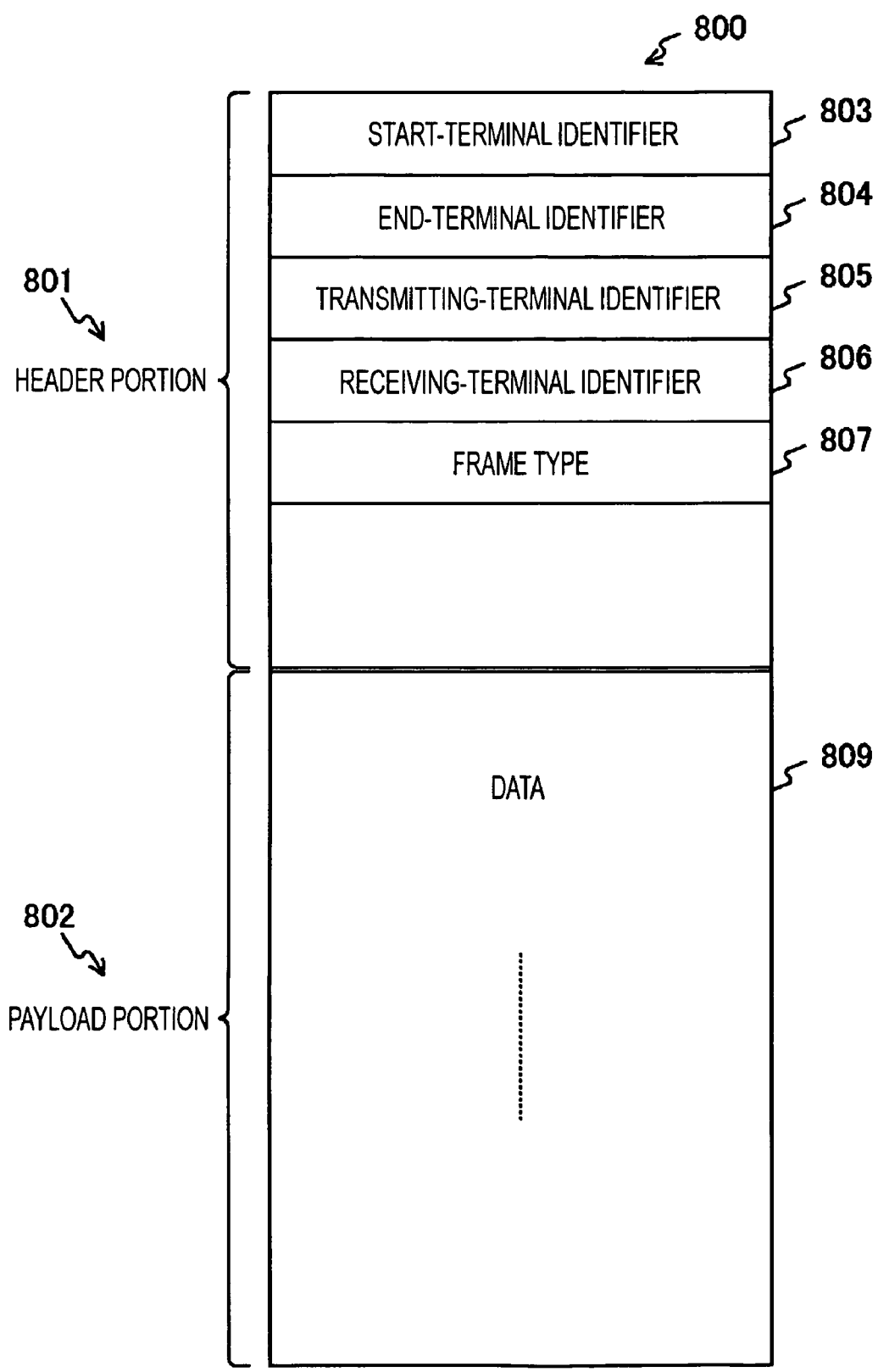
FIG. 8 is an illustration showing the frame structure for use in broadcast communication and unicast communication according to the embodiment of the present invention.

FIG. 8 shows the frame structure for use in broadcast communication and unicast communication according to the embodiment of the present invention. A frame 800 is constituted by a header portion 801 and a payload portion 802. The header portion 801 includes a start-terminal identifier 803, an end-terminal identifier 804, a transmitting-terminal identifier 805, a receiving-terminal identifier 806, a frame type 807, and the presence of attribute certificate 808. The start-terminal identifier 803 represents a terminal identifier of a terminal that originates this frame. As described above, the terminal identifier may be any identifier that uniquely identifies a terminal in a network, and may be represented by, for example, a MAC address in the Ethernet®. The end-terminal identifier 804 represents a terminal identifier of a final destination terminal of this frame.

The transmitting-terminal identifier 805 and the receiving-terminal identifier 806 are used for relaying the frame. In the wireless ad-hoc communication system, all terminals within a network cannot directly communicate with one another, and a multi-hop communication path must be set up to transmit a frame to a terminal that is out of radio coverage via another terminal. In this case, the transmitting-terminal identifier 805 and the receiving-terminal identifier 806 are used by terminals that transmit and receive the frame. The frame type 807 represents the type of frame.

The payload portion 802 stores data 809 that is communication content. The payload portion 802 is to be encrypted and decoded by the unicast encryption key and the broadcast encryption key.

Figure 13:
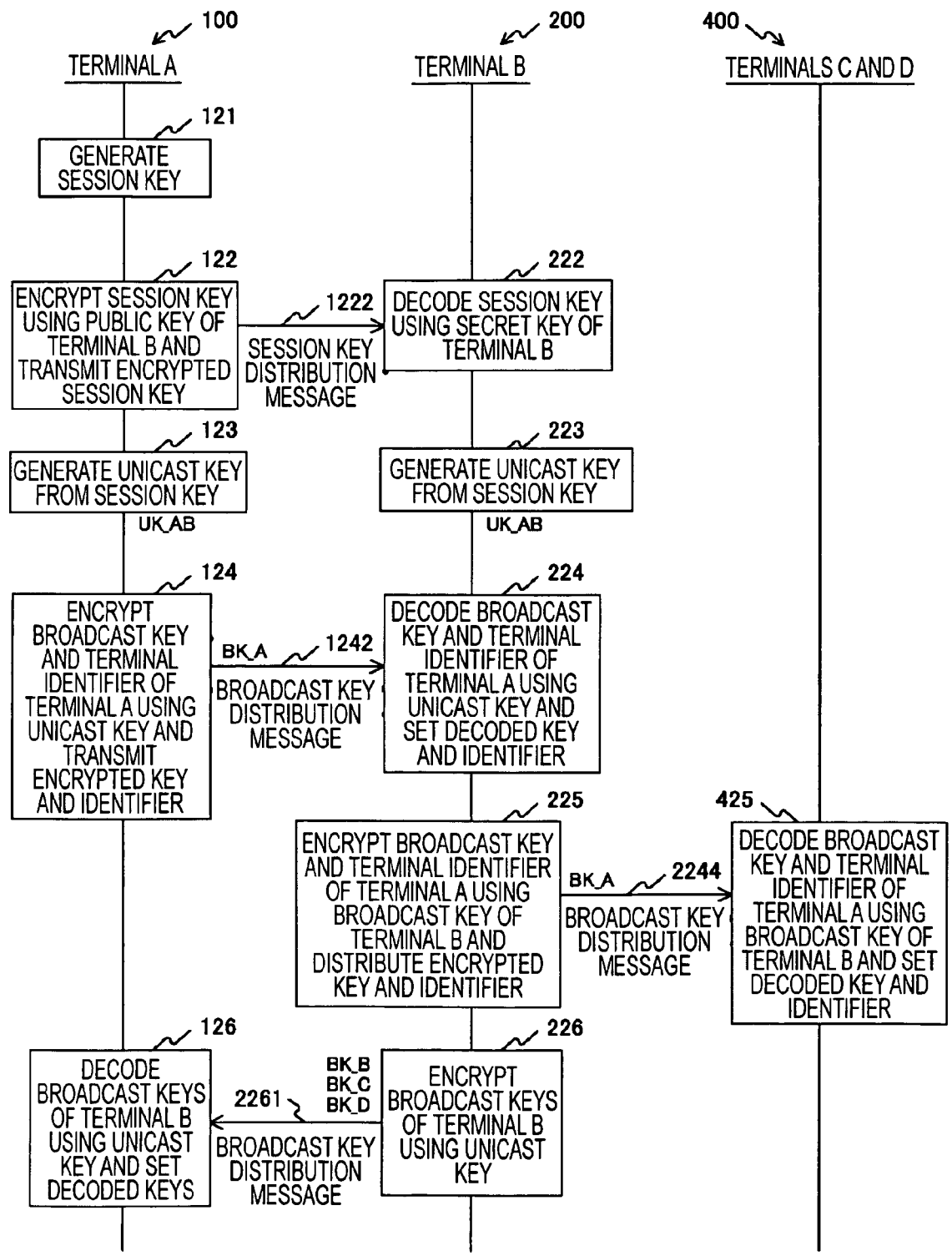
FIG. 13 is a chart showing an encryption key distribution procedure according to the embodiment of the present invention.

The operation of the wireless ad-hoc communication system according to the embodiment of the present invention will now be described with reference to the drawings. In the embodiment of the present invention, terminals perform mutual authentication using an attribute certificate when a terminal accesses a network resource (see FIG. 9), and after the mutual authentication succeeds, a session key is distributed, a unicast encryption key is generated, and a broadcast encryption key is distributed (see FIG. 13). The processes shown in FIGS. 9 and 13 are implemented by the control unit 330,of the wireless terminal 300.

It is premised that the attribute certificate for use in the mutual authentication is appropriately issued in advance, and is stored in the attribute certificate table 620 (see FIG. 1,) of each terminal. It is also premised that a public key of an attribute-certificate issuing terminal required for verifying the attribute certificate is preset in the public key certificate 612 (see FIG. 2) in the attribute-certificate-issuing-terminal list table 610 of each terminal.

Figure 9:
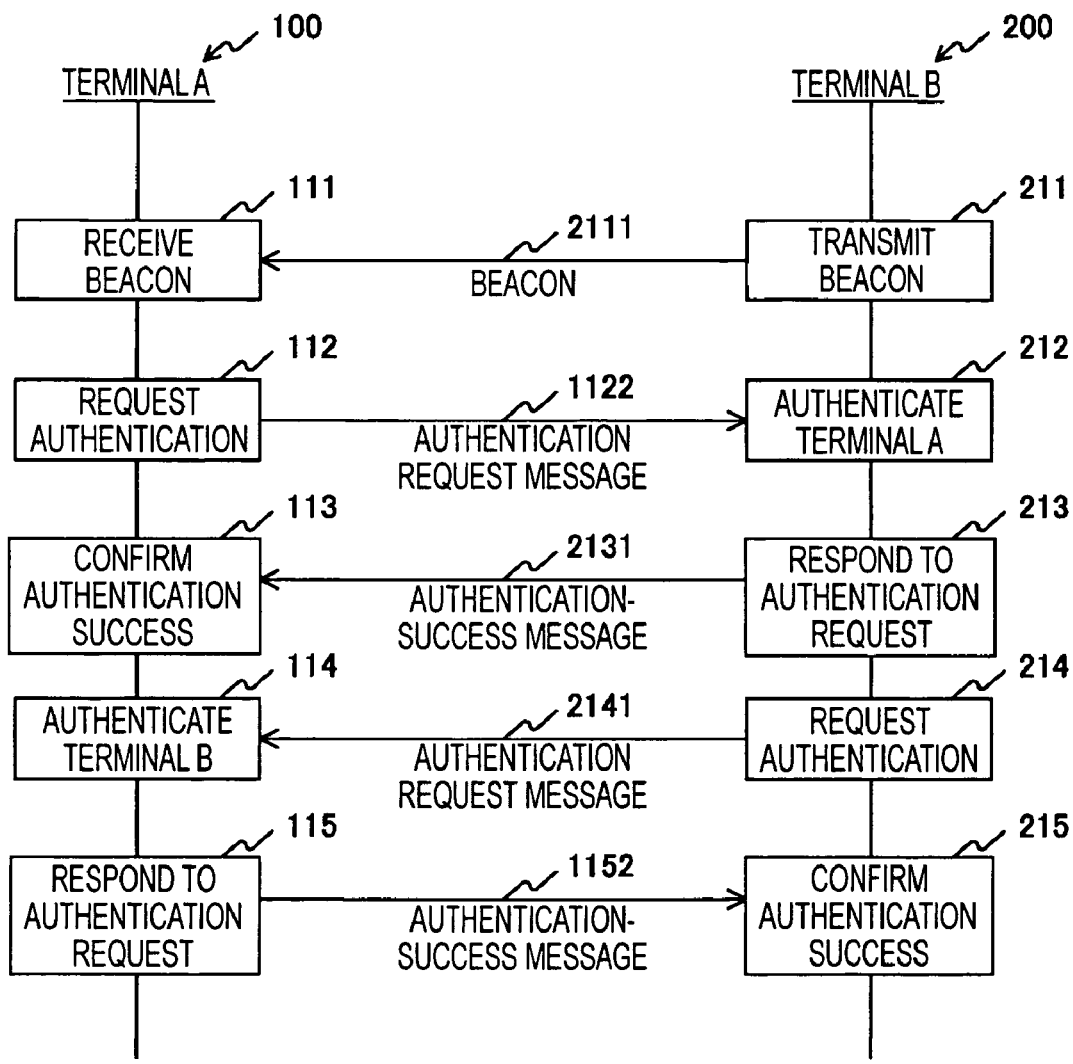
FIG. 9 is a chart showing a mutual authentication procedure according to the embodiment of the present invention.

FIG. 9 is a chart showing a mutual authentication procedure according to the embodiment of the present invention. In the wireless ad-hoc communication system according to the embodiment of the present invention, each terminal constantly transmits a beacon to notify other terminals of the presence of this terminal. In the following description, it is presumed that the beacon of a terminal B acts as a trigger for a terminal A to request authentication. However, as long as mutual authentication is finally performed, the beacon of either terminal may act as a trigger.

Figure 10:
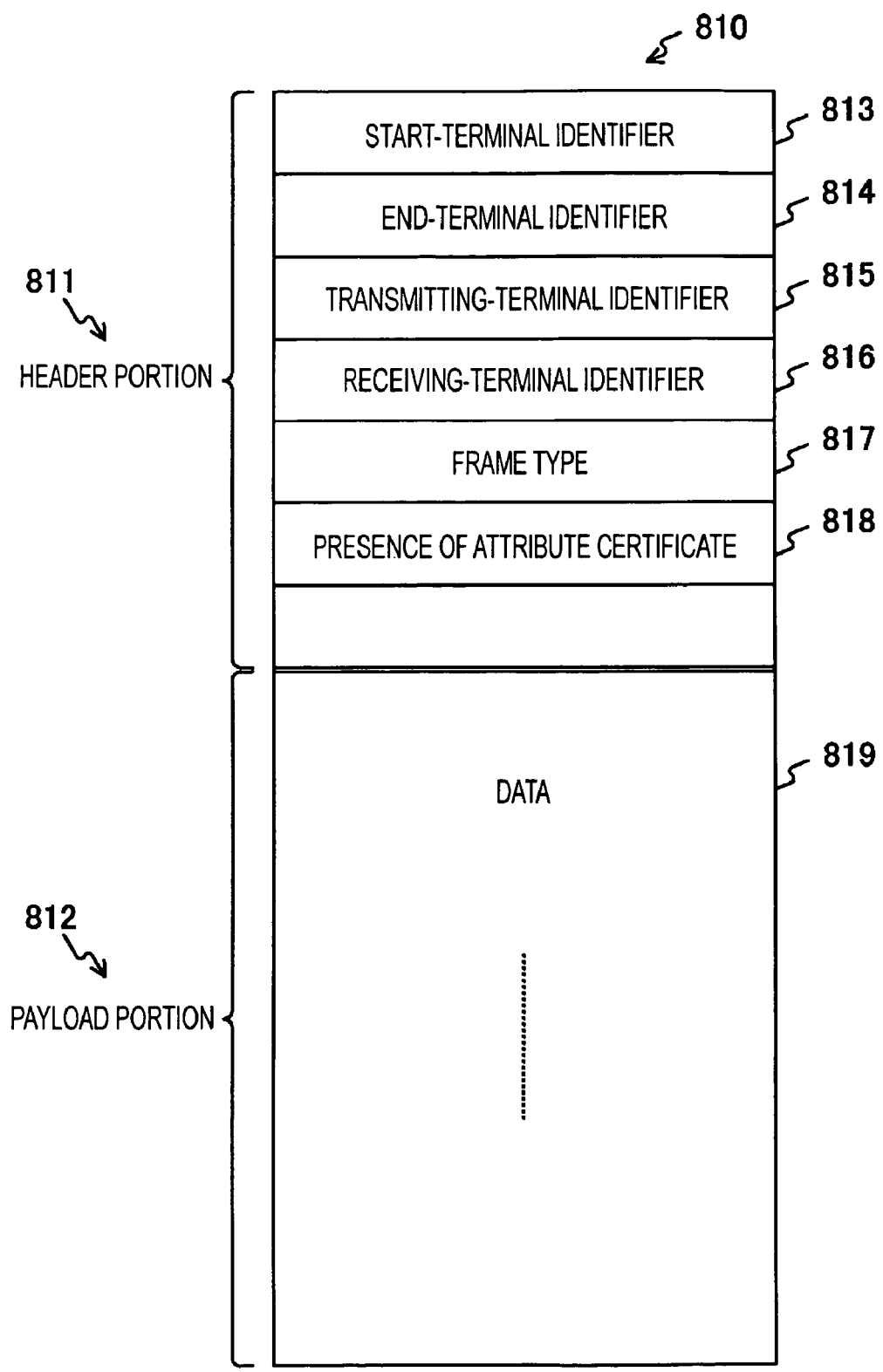
FIG. 10 is an illustration showing an example structure of a beacon frame 810 according to the embodiment of the present invention.

First, the terminal B transmits (211) a beacon 2111. The frame structure of the beacon 2111 is shown in FIG. 10. A beacon frame 810 is based on the structure of the frame 800 described above with reference to FIG. 8, and is also constituted by a header portion 811 and a payload portion 812. Terminal identifiers 813 to 816 are also similar to the terminal identifiers 803 to 806 shown in FIG. 8, respectively. In the beacon frame 810, the end-terminal identifier 814 has a broadcast address (for example, all bits are set to 1). A frame type 817 indicates a beacon frame. The presence of attribute certificate 818 indicates whether or not a transmitting terminal of the beacon frame has an attribute certificate indicating access rights to the network resources. If the presence of attribute certificate 818 indicates that the attribute certificate is not present, mutual authentication is not continued, and an action, such as an action to prompt acquisition of the attribute certificate, may be taken.

Figure 11:
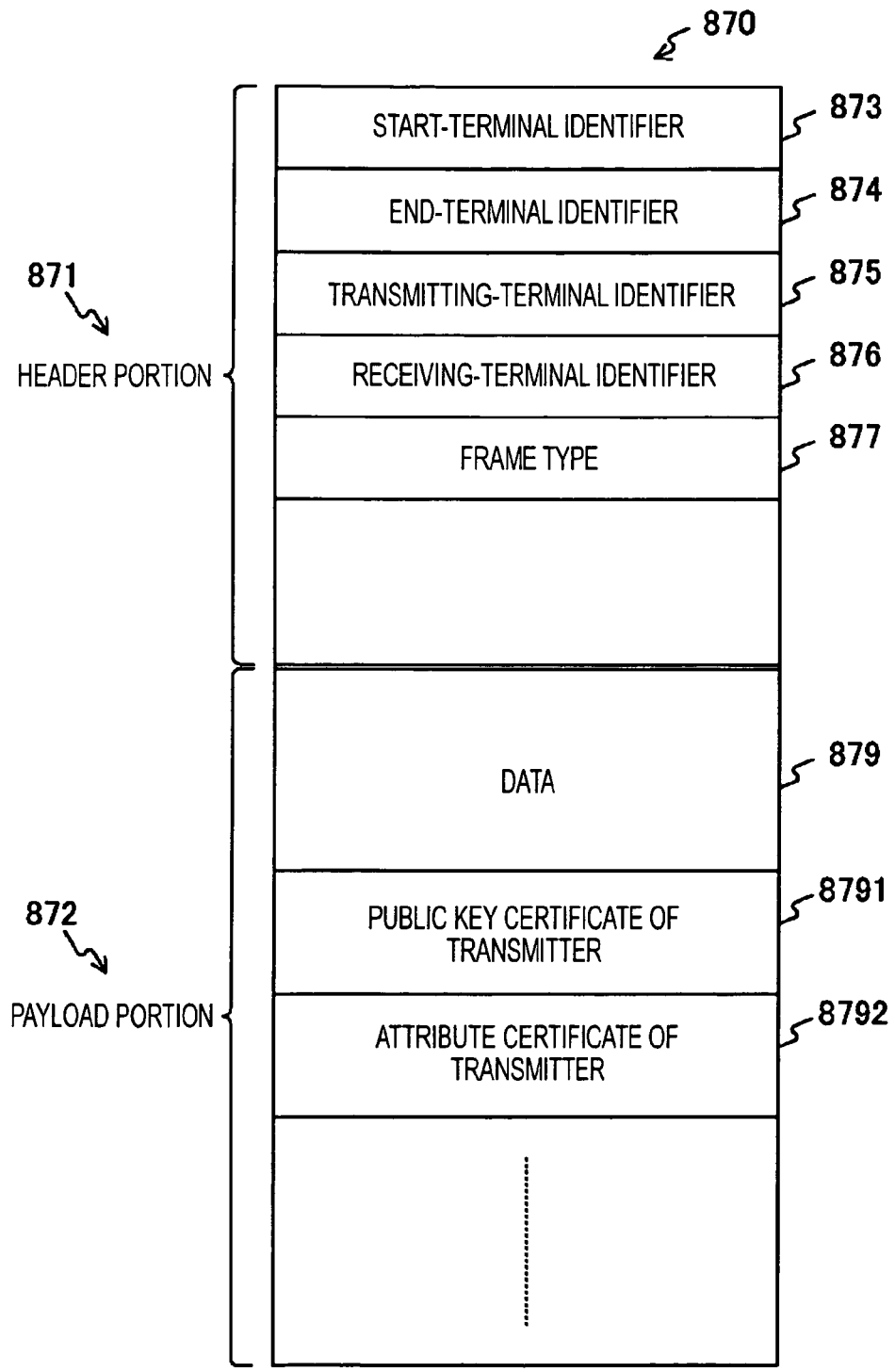
FIG. 11 is an illustration showing an example structure of an authentication request frame 870 according to the embodiment of the present invention.

Upon receiving (111) the beacon 2111 transmitted from the terminal B, the terminal A checks the presence of attribute certificate 818 of the beacon frame 810. If it is determined that the terminal B has an attribute certificate, the terminal A transmits (112) an authentication request message 1122 for authenticating the terminal A to the terminal B. The frame structure of the authentication request message 1122 is shown in FIG. 11. An authentication request frame 870 is based on the structure of the frame 800 described above with reference to FIG. 8, and is also constituted by a header portion 871 and a payload portion 872. Terminal identifiers 873 to 876 are also similar to the terminal identifiers 803 to 806 shown in FIG. 8, respectively. A frame type 877 indicates an authentication request frame.

In authentication request frame 870, data 879 in the payload portion 872 includes a public key certificate 8791 and an attribute certificate 8792 of the terminal A serving as a transmission source. The public key certificate 8791 of the terminal A is stored in advance in the generated-key table 650 of the terminal A, and the attribute certificate 8792 of the terminal A is stored in advance in the attribute certificate table 620 of the terminal A.

Upon receiving the authentication request message 1122 transmitted from the terminal A, the terminal B authenticates (212) the terminal A from the content. More specifically, the public key of the attribute certificate authority is extracted from the public key certificate 612 (see FIG. 2) of the attribute-certificate-issuing-terminal list table 610, and the signature 729 (see FIG. 4) of the attribute certificate 8792 included in the authentication request message 1122 is decoded using the extracted public key to obtain a message digest at the signature time. Then, a message digest of the attribute certification information 721 (see FIG. 4) of the attribute certificate 8792 is newly generated. The newly generated message digest is checked for the conformity to the message digest at the signature time. If a match is not found between these message digests, the attribute certificate can be tampered with after the signature, and the attribute certificate verification fails. If a match is found, the owner public key certificate identifier 723 (see FIG. 4) of the attribute certificate 8792 included in the authentication request message 1122 is further checked for the conformity to the issuer 714 and the serial number 712 (see FIG. 3) of the public key certificate 8791 included in the authentication request message 1122. If a match is found, it is verified that the terminal A, which is the owner of the public key certificate, is also the owner of the attribute certificate. If a match is not found, the terminal A is not the owner of the attribute certificate, and the attribute certificate verification fails.

Figure 12:
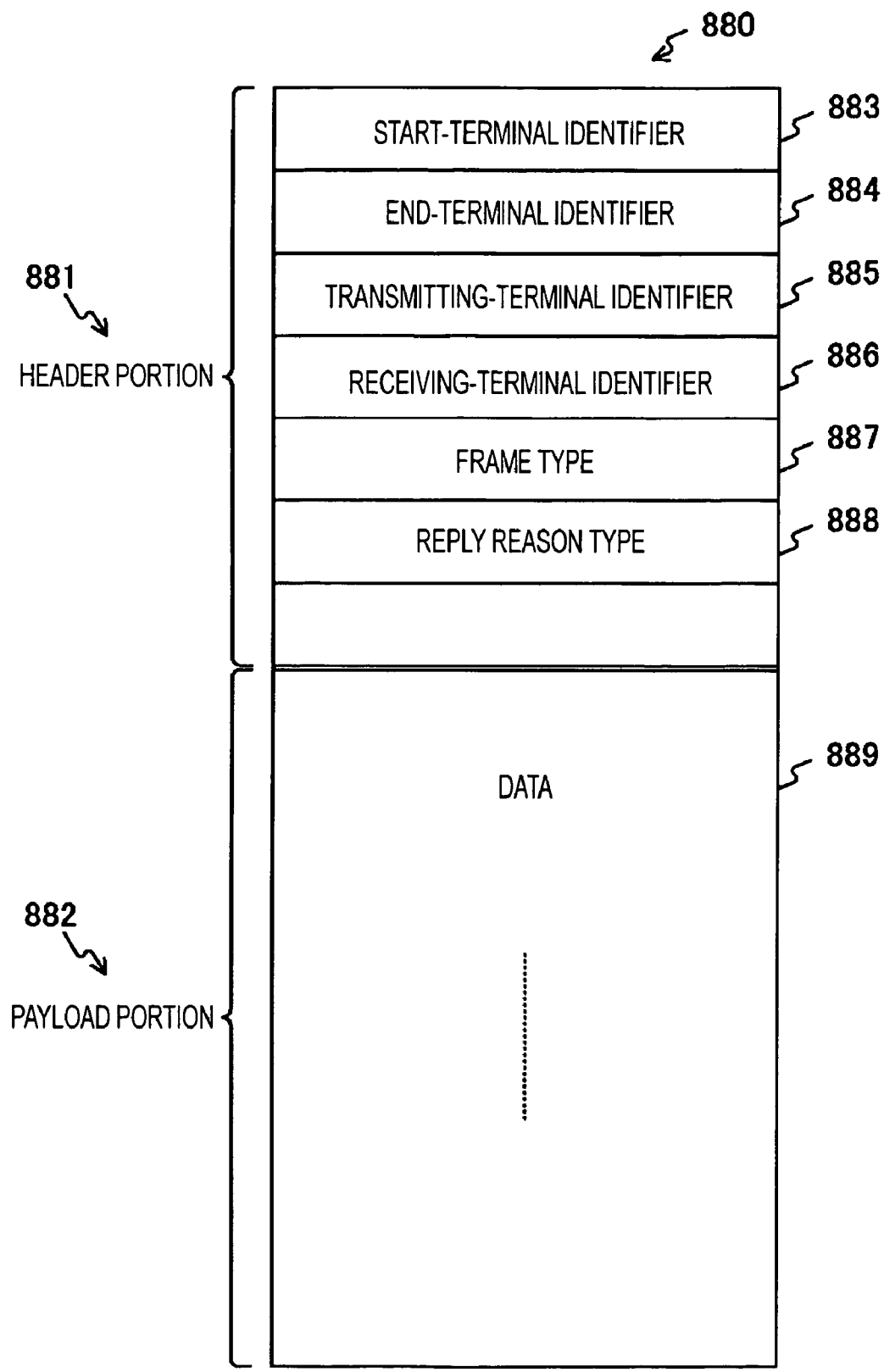
FIG. 12 is an illustration showing an example structure of an authentication reply frame 880 according to the embodiment of the present invention.

If the authentication (212) of the terminal A succeeds, the terminal B transmits (213) an authentication-success message 2131 for notifying a success in the authentication of the terminal A to the terminal A. The authentication reply frame structure of the authentication-success message 2131 is shown in FIG. 12. An authentication reply frame 880 is based on the structure of the frame 800 described above with reference to FIG. 8, and is also constituted by a header portion 881 and a payload portion 882. Terminal identifiers 883 to 886 are also similar to the terminal identifiers 803 to 806 shown in FIG. 8, respectively. In the authentication-success message 2131, a frame type 887 indicates an authentication-success frame. The authentication reply frame 880 further includes a reply reason type 888, which is not required when the authentication succeeds.

If the attribute certificate verification (212) of the terminal A fails, the terminal B transmits an authentication-error message for notifying a success in the authentication of the terminal A to the terminal A. The authentication reply frame structure of the authentication-error message is described above with reference to FIG. 12. However, in the authentication-error message, the frame type 887 indicates an authentication-error frame, and the reply reason type 888 includes coded reasons of the authentication error, such as inconformity of the message digests of the attribute certificate and revocation of the attribute certificate. The authentication-success message 2131 or the authentication-error message is received and checked (113) by the terminal A.

If the attribute certificate verification (212) of the terminal A succeeds, the terminal B further transmits (214) an authentication request message 2141 to the terminal A to authenticate the terminal B. The frame structure of the authentication request message 2141 is similar to that described above with reference to FIG. 11, and the public key certificate 8791 and the attribute certificate 8792 of the terminal B serving as a transmission source are included.

Upon receiving the authentication request message 2141 transmitted from the terminal B, the terminal A authenticates (114) the terminal B from the content. Like the authentication (212) of the terminal A performed in the terminal B, described above, the authentication includes verification of the attribute certificate, confirmation of the attribute certificate owner, and so on.

If the authentication (212) of the terminal B succeeds, the terminal A transmits (115) an authentication-success message 1152 for notifying a success in the authentication of the terminal B to the terminal B. The authentication reply frame structure of the authentication-success message 1152 is similar to that described above with reference to FIG. 12. If the attribute certificate verification (212) of the terminal B fails, the terminal A transmits an authentication-error message for notifying a success in the authentication of the terminal B to the terminal B. The authentication reply frame structure of the authentication-error message is also described above with reference to FIG. 12. The authentication-success message 1152 or the authentication-error message is received and checked (215) by the terminal B.

When the terminal A and the terminal B successfully authenticate each other, the mutual authentication is finished. Then, an encryption key is distributed.

FIG. 13 is a chart showing an encryption key distribution procedure according to the embodiment of the present invention. In FIG. 13, a terminal A (100) is a new terminal that is to participate in a network, and a terminal B (200) is an attribute-certificate issuing terminal that has participated in the network.

Figure 14:
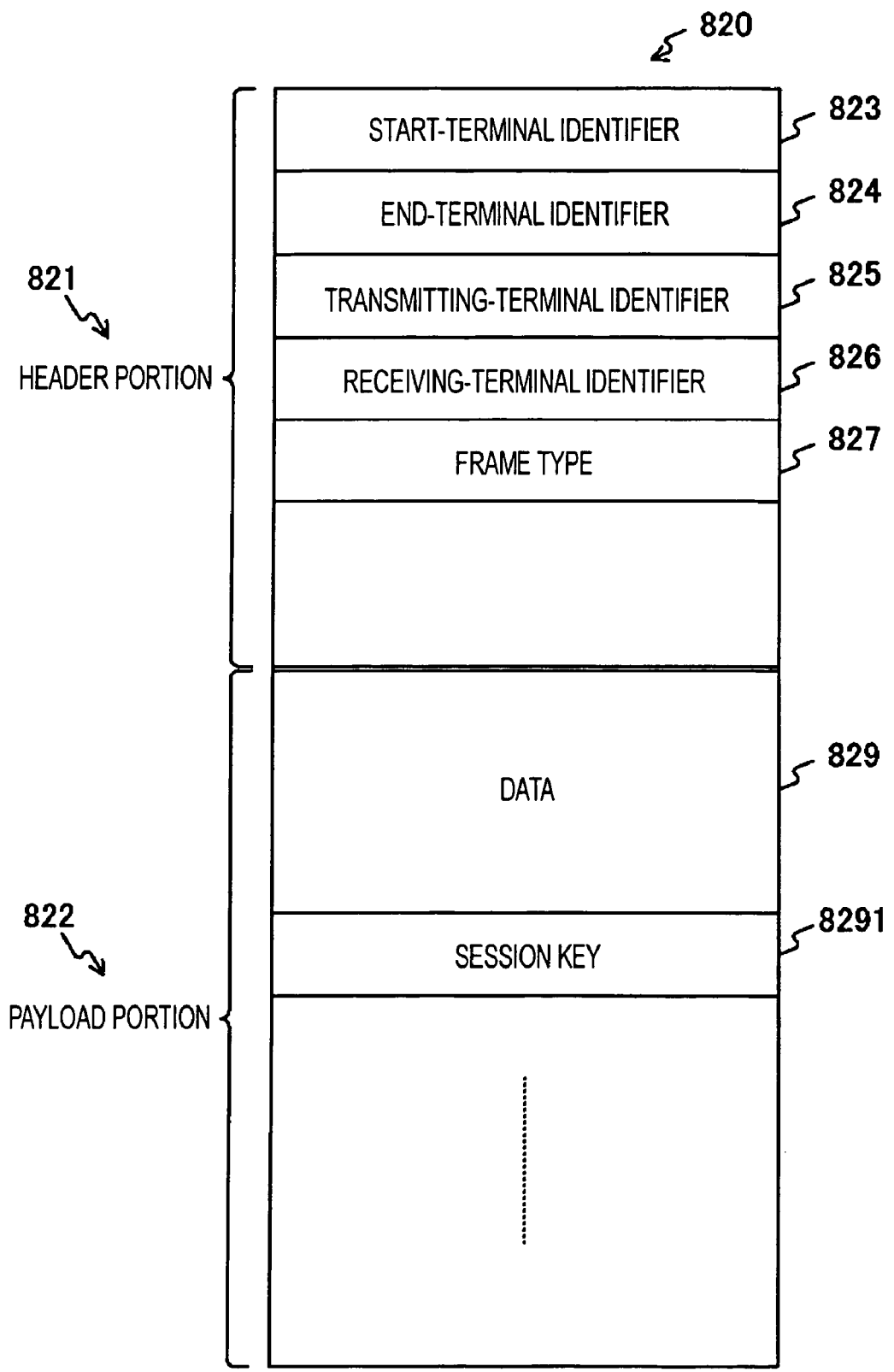
FIG. 14 is an illustration showing an example structure of a session key distribution frame 820 according to the embodiment of the present invention.

First, the terminal A generates (121) a session key for performing communication with the terminal B. The session key is a common key between the terminal A and the terminal B, and may be generated using random numbers. The terminal A encrypts the session key using a public key of the terminal B to produce a session key distribution message 1222, and transmits (122) the session key distribution message 1222 to the terminal B. The session key distribution frame structure of the session key distribution message 1222 is shown in FIG. 14. A session key distribution frame 820 is based on the structure of the frame 800 described above with reference to FIG. 8, and is also constituted by a header portion 821 and a payload portion 822. Terminal identifiers 823 to 826 are also similar to the terminal identifiers 803 to 806 shown in FIG. 8, respectively. A frame type 827 indicates a session key distribution frame. Data 829 in the payload portion 822 includes a session key 8291.

The payload portion 822 of the session key distribution frame is not to be encrypted or decoded by a unicast encryption key or a broadcast encryption key. The payload portion 822 is encrypted by a public key of a receiving terminal, and is decoded by a secret key of the receiving terminal. The terminal A has received a public key certificate of the terminal B during mutual authentication, and can therefore obtain the public key of the terminal B based on the owner public key 717 (see FIG. 3).

Upon receiving the session key distribution message 1222 transmitted from the terminal A, the terminal B decodes (222) the session key 8291 using a secret key of the terminal B. Thus, the same session key is shared between the terminal A and the terminal B.

Then, the terminal A and the terminal B generate (123 and 223) a unicast encryption key (UK_AB) from the session key. The unicast encryption key may be obtained by using the session key as it is, or by using the session key as a seed to generate a new unicast encryption key by a hash function. The unicast encryption key (UK_AB) between the terminal A and the terminal B is stored in the corresponding unicast encryption key 662 in the encryption-key management list table 660 (see FIG. 5) of both terminals.

Figure 15:
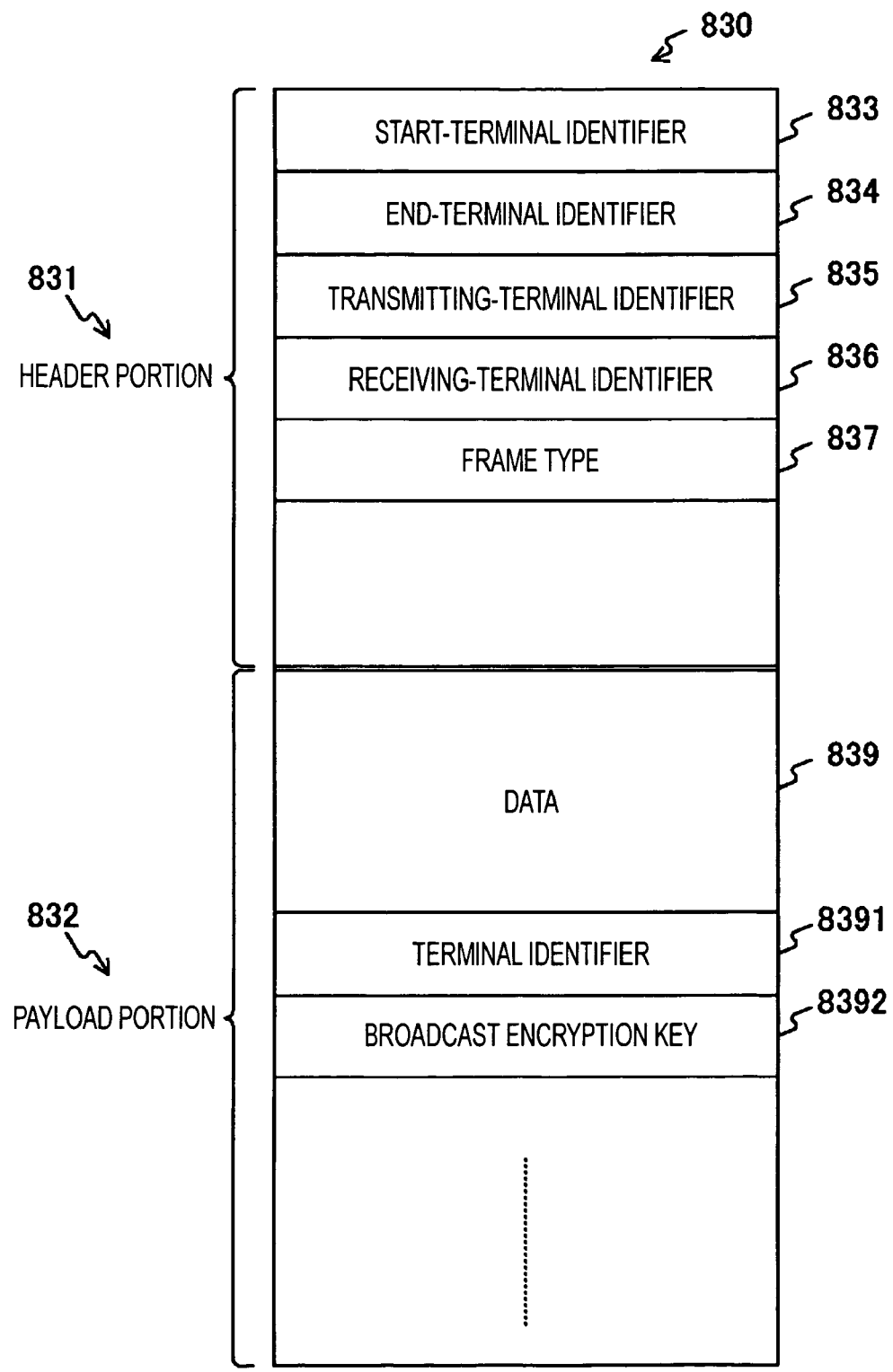
FIG. 15 is an illustration showing an example structure of a broadcast key distribution frame 830 according to the embodiment of the present invention.

Then, the terminal A encrypts a set of a pre-generated broadcast encryption key (BK_A) of the terminal A and a terminal identifier of the terminal A using the unicast encryption key (UK_AB) shared with the terminal B to produce a broadcast key distribution message 1242, and transmits the broadcast key distribution message 1242 to the terminal B (124). The broadcast key distribution frame structure of the broadcast key distribution message 1242 is shown in FIG. 15. A broadcast key distribution frame 830 is based on the structure of the frame 800 described above with reference to FIG. 8, and is also constituted by a header portion 831 and a payload portion 832. Terminal identifiers 833 to 836 are also similar to the terminal identifiers 803 to 806 shown in FIG. 8, respectively. A frame type 837 indicates a broadcast key distribution frame. Data 839 in the payload portion 832 includes a set of a terminal identifier 8391 and a broadcast encryption key 8392. The terminal A stores the broadcast encryption key (BK_A) 8392 of the terminal A in the generated-key table 650. The unicast encryption key (UK_AB) used for encrypting the payload portion 832 of the broadcast key distribution message 1242 is stored in the unicast encryption key 662 in the encryption-key management list table 660 (see FIG. 5).

Upon receiving the broadcast key distribution message 1242 from the terminal A, the terminal B decodes (224) the payload portion 832 of the broadcast key distribution message 1242 using the unicast encryption key (UK_AB) shared with the terminal A. Thus, the broadcast encryption key and the terminal identifier of the terminal A are obtained. The broadcast encryption key of the terminal A is stored in association with the terminal identifier of the terminal A into the broadcast encryption key 663 in the encryption-key management list table 660 (see FIG. 5).

Then, the terminal B encrypts the set of the broadcast encryption key (BK_A) of the terminal A and the terminal identifier of the terminal A using a broadcast encryption key (BK_B) of the terminal B to produce a broadcast key distribution message 2244, and broadcasts the broadcast key distribution message 2244 to other terminals (225). The broadcast key distribution frame structure of the broadcast key distribution message 2244 is described above with reference to FIG. 15, except that the end-terminal identifier 834 has a broadcast address (for example, all bits are set to 1).

Upon receiving the broadcast key distribution message 2244 from the terminal B, other terminals 400 (e.g., a terminal C and a terminal D) decode the payload portion 832 of the broadcast key distribution message 2244 using the broadcast encryption key (BK_B) of the terminal B (425). Thus, the broadcast encryption key and the terminal identifier of the terminal A are obtained. The broadcast encryption key of the terminal A is stored in association with the terminal identifier of the terminal A into the broadcast encryption key 663 in the encryption-key management list table 660 (see FIG. 5).

The terminal B further encrypts sets of all broadcast encryption keys 663 contained in the encryption-key management list table 660 of the terminal B and the corresponding terminal identifiers 661 using the unicast encryption key (UK_AB) shared with the terminal A to produce a broadcast key distribution message 2261, and transmits the broadcast key distribution message 2261 to the terminal A (226). The broadcast key distribution frame structure of the broadcast key distribution message 2261 is described above with reference to FIG. 15, except that the payload portion 832 may include a plurality of sets of terminal identifiers 8391 and broadcast encryption keys 8392.

Upon receiving the broadcast key distribution message 2261 from the terminal B, the terminal A decodes the payload portion 832 of the broadcast key distribution message 2261 using the unicast encryption key (UK_AB) shared with the terminal B (126). Thus, the sets of broadcast encryption keys and terminal identifiers of other terminals are obtained. The broadcast encryption keys of other terminals are stored in association with the terminal identifiers of the corresponding terminals into the broadcast encryption key 663 in the encryption-key management list table 660 (see FIG. 5).

An encryption key selecting algorithm of each terminal in the wireless ad-hoc communication system according to the embodiment of the present invention will now be described with reference to the drawings.

Figure 16:
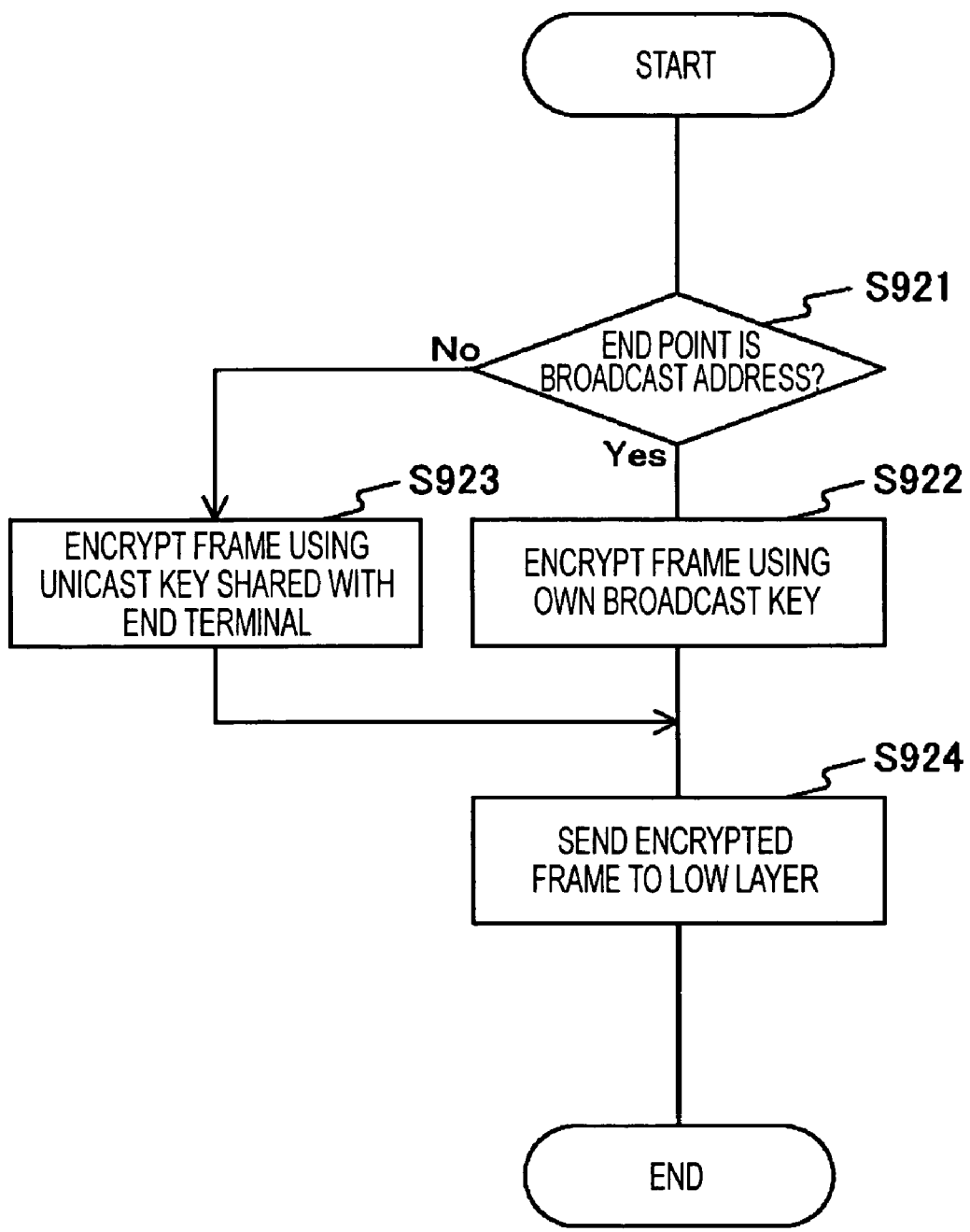
FIG. 16 is a chart showing an encryption key selecting algorithm for frame transmission according to the embodiment of the present invention.

FIG. 16 is a chart showing an encryption key selecting algorithm when a terminal transmits a frame according to the embodiment of the present invention. In the frame shown in FIG. 8, a broadcast frame indicates that the end-terminal identifier 804 is a broadcast address (step S921), and the payload portion 802 is encrypted using the broadcast encryption key of this terminal (step S922). On the other hand, if the frame is not a broadcast frame, the end-terminal identifier 804 is other than a broadcast address (step S921), and the unicast encryption key 662 corresponding to the terminal identifier 661 matched to the end-terminal identifier 804 is extracted from the encryption-key management list table 660 shown in FIG. 5, and the payload portion 802 is encrypted using this unicast encryption key (step S923). Then, the encrypted frame is sent to a low layer (step S924).

Figure 17:
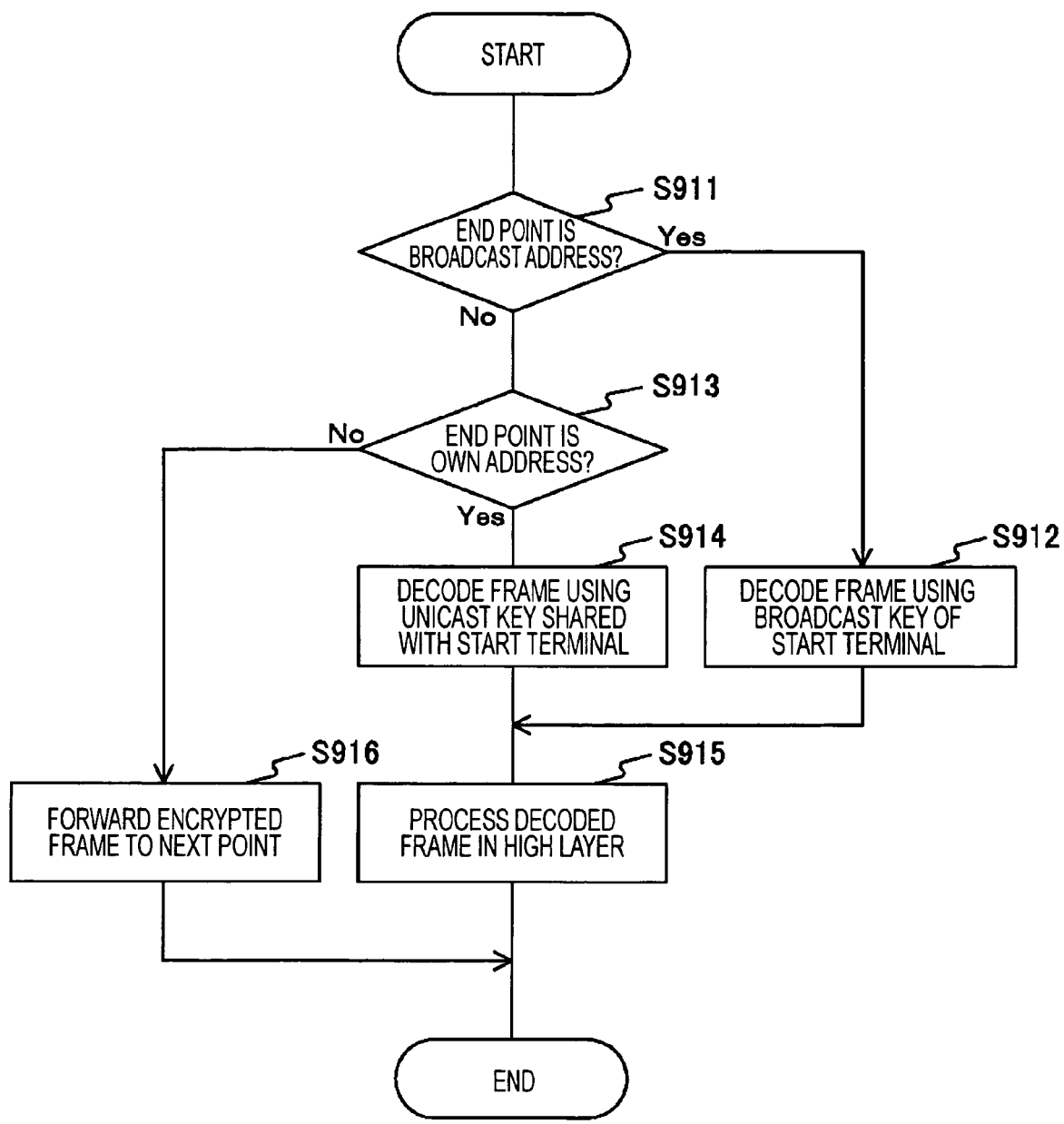
FIG. 17 is a chart showing an encryption key selecting algorithm for frame transmission according to the embodiment of the present invention.

FIG. 17 is a chart showing an encryption key selecting algorithm when a terminal receives a frame according to the embodiment of the present invention. In the frame shown in FIG. 8, if the end-terminal identifier 804 is a broadcast address (step S911), the broadcast encryption key 663 corresponding to the terminal identifier 661 matched to the start-terminal identifier 803 is extracted from the encryption-key management list table 660 shown in FIG. 5, and the payload portion 802 is decoded using this broadcast encryption key (step S912).

If the end-terminal identifier 804 is not a broadcast address (step S911) but is the terminal identifier of this terminal (step S913), the unicast encryption key 662 corresponding to the terminal identifier 661 matched to the start-terminal identifier 803 is extracted from the encryption-key management list table 660 shown in FIG. 5, and the payload portion 802 is decoded using this unicast encryption key (step S914). The frame decoded in step S912 or S914 is processed in a high layer (step S915).

On the other hand, if the end-terminal identifier 804 is not a broadcast address (step S911) or the terminal identifier of this terminal (step S913), the frame is forwarded to the terminal at the next point (step S916). The terminal at the next point can be determined by extracting the end-terminal identifier 681 matched to the end-terminal identifier 804 of the frame 800 (see FIG. 8) from the routing table 680 (see FIG. 7) and by referring to the corresponding forwarding-terminal identifier 682.

According to the embodiment of the present invention, therefore, the broadcast encryption key 663 is stored in association with the terminal identifier 661 into the encryption-key management list table 660, thus allowing broadcast encryption keys different from one terminal to another to be used. These broadcast encryption keys are generated by terminals that perform broadcast communication and are distributed by the sequence shown in FIG. 13 or the like. Thus, in an environment that is not suitable for solely managing broadcast encryption keys, such as a wireless ad-hoc communication system, the broadcast encryption keys can be managed by individual terminals in an independent and distributed manner.

While the embodiment of the present invention relates to broadcasts to be equally distributed to all terminals belonging to a network, the term "broadcast" is not to be restrictively construed but is to be construed as broad concept to cover a "multicast."

While the embodiment of the present invention has been described by way of example, the present invention is not limited to the form described above, and a variety of modifications may be made without departing from the scope of the present invention.

The operation procedures described above may be regarded as a method having the series of procedures, or may be regarded as a program for causing a computer to execute the series of procedures or a recording medium that stores the program.

INDUSTRIAL APPLICABILITY

As is apparent from the foregoing description, the present invention can take an advantage that broadcast encryption keys are managed in an independent and distributed manner in a wireless ad-hoc communication system.

The invention claimed is:

1. A terminal, comprising:
an encryption-key management list table having at least one encryption-key management list comprising a terminal identifier of a different terminal, a unicast encryption key between the terminal and the different terminal, and a broadcast encryption key assigned to the different terminal;
means for searching the encryption-key management list table for the encryption-key management list including an origination-terminal identifier corresponding to an originating terminal identifier in a received broadcast frame;
means for extracting a broadcast encryption key from the encryption-key management list that corresponds to the origination-terminal identifier; and
means for decoding a payload of the broadcast frame using the extracted broadcast encryption key.

2. A terminal, comprising:
an encryption-key management list table having at least one encryption-key management list configured to store a unicast encryption key between the terminal and a different terminal and a broadcast encryption key assigned to the different terminal in association with a terminal identifier of the different terminal;
means for searching, when a destination-terminal identifier of a received frame is a broadcast address, the encryption-key management list table for the encryption-key management list including an origination-terminal identifier of the received frame to extract the corresponding broadcast encryption key as an encryption key, and when the destination-terminal identifier of the received frame is other than the broadcast address, searching the encryption-key management list table for the encryption-key management list including the origination-terminal identifier of the received frame to extract the corresponding unicast encryption key as the encryption key; and
means for decoding a payload of the received frame using the extracted encryption key.

3. A terminal, comprising:
a generated-key table configured to store a broadcast encryption key assigned to the terminal;
an encryption-key management list table having at least one encryption-key management list configured to store a unicast encryption key between the terminal and a different terminal in association with a terminal identifier of the different terminal;
means for, when a frame to be transmitted is a broadcast frame indicated by an end-terminal identifier being a broadcast address, encrypting a payload of the broadcast frame using the broadcast encryption key of the generated-key table, and when the frame to be transmitted is a unicast frame indicated by the end-terminal identifier not being the broadcast address, searching the encryption-key management list table for the encryption-key management list including a destination-terminal identifier of the unicast frame to encrypt a payload of the unicast frame using the corresponding unicast encryption key; and
means for transmitting the encrypted frame.

4. A method for decoding a broadcast frame in a terminal that includes an encryption-key management list table having at least one encryption-key management list including a terminal identifier of a different terminal, a unicast encryption key assigned for communication between the terminal and the different terminal, and a broadcast encryption key assigned to the different terminal, the method comprising:
- searching the encryption-key management list table for the encryption-key management list including an origination-terminal identifier corresponding to an originating terminal identifier in a received broadcast frame to extract a broadcast encryption key corresponding to the origination-terminal identifier; and
- decoding a payload of the broadcast frame using the extracted broadcast encryption key.

5. A non-transitory computer readable storage medium in which a program is stored that causes a terminal including an encryption-key management list table having at least one encryption-key management list including a terminal identifier of a transmission terminal, a unicast encryption key assigned for communication between the terminal and the transmission terminal, and a broadcast encryption key assigned to the transmission terminal to execute a method comprising:
- searching the encryption-key management list table for the encryption-key management list including an origination-terminal identifier corresponding to an originating terminal identifier in a received broadcast frame to extract a broadcast encryption key corresponding to the origination-terminal identifier; and
- decoding a payload of the broadcast frame using the extracted broadcast encryption key.

* * * * *